United States Patent [19]
Shaw

[11] Patent Number: 4,816,302
[45] Date of Patent: Mar. 28, 1989

[54] DECORATIVE WALL HANGING

[76] Inventor: Michael W. Shaw, 2631 Hidden Garden, Kingwood, Tex. 77339

[21] Appl. No.: 140,637
[22] Filed: Jan. 4, 1988
[51] Int. Cl.4 .......... B32B 3/14; B44F 3/00
[52] U.S. Cl. .......... 428/33; 428/542.2; 428/904.4
[58] Field of Search .......... 428/33, 542.2, 904.4

[56] References Cited

U.S. PATENT DOCUMENTS 3,606,338 9/1971 Cannata .......... 428/33 X

FOREIGN PATENT DOCUMENTS 1601460 10/1981 United Kingdom .......... 428/33

*Primary Examiner*—Henry F. Epstein
*Attorney, Agent, or Firm*—Roger A. Marrs

[57] ABSTRACT

A decorative wall hanging is disclosed herein having a first member carrying a graphic representation on a framed display surface wherein the graphic representation is composed of a plurality of interfitted irregular puzzle pieces. The graphic representation is characterized as having a single puzzle piece missing from the plurality so that a space or void is exposed defined by the surrounding irregular shape of adjacent puzzle pieces. A second member of the wall hanging is arranged in close proximity to the first member having an irregular periphery conformal in shape to the space defined on the first member and carrying a portion of the graphic representation on its exterior surface. The second member is characterized by being notably larger in size as compared to the size of the space or void in the graphic representation of the first member.

1 Claim, 1 Drawing Sheet

DECORATIVE WALL HANGING

BACKGROUND OF THE INVENTION

1. Field of the Invention

The present invention relates to decorative art work and more particularly to a novel wall hanging having a first member with a shaped space or aperture and a second member conformal in shape to the space provided in the first member but characterized as being substantially larger in size so that a composite visual pattern or arrangement is produced when the members are placed side-by-side.

2. Brief Description of the Prior Art

In the past, it has been the conventional practice to utilize wall hangings in the form of framed pictures, tapestries, shelf-mounted figures or the like. In the instance of pictures, the art work is sometimes arranged in the form of a graphic rendering placed on a surface which is composed of a plurality of puzzle pieces. Each piece is of an irregular shape and fits into a pattern or mosaic matrix so that a total graphic rendering is produced when all the pieces are arranged together. Therefore, the graphic rendering constitutes the art work and can be used as a wall hanging.

Although such a rendering is pleasing and decorative, little imagination or mystery is provided to an observer, which would heighten the interest and decorative value of the art work. The observer visually reviews the graphic rendering which is complete and is unitized totally to fully represent the graphic representation which may be any pictorial subject matter.

Therefore, a long standing need has existed to provide a novel decorative art work suitable as a wall hanging which not only provides a desired graphic representation but stimulates the observer into solving a graphic mystery. Preferably, the novel art work should include a plurality of puzzle pieces which, when arranged properly, portray the desired graphic subject matter; however, portions of the subject matter are intentionally omitted with conformal pictorial subject matter being carried on separate and adjacent pieces of the puzzle in an enlarged form.

SUMMARY OF THE INVENTION

Accordingly, the above problems and difficulties are obviated by the present invention which provides a novel decorative wall hanging as an art form or work, comprising a first framed member having a planar surface carrying a graphic representation and wherein the member is composed of a plurality of irregular puzzle pieces that are interlocked to provide a coextensive surface carrying the graphic subject matter. At least one puzzle piece of the plurality is left out of the mosaic or matrix so that an irregularly shaped space or void is defined by a plurality of surrounding puzzle pieces. A second member having the shape conformal to the void or space in the first member is greatly enlarged and arranged in close proximity to the first member so that a visual co-relationship is established between the two members when observed by a viewer. The second member includes a portion of the graphic representation or subject matter of the first member that is associated with and compatible with the graphic representation or subject matter of the surrounding puzzle pieces defining the space or void.

Therefore, the combined first and second members, when arranged side-by-side in spaced relationship, provide a composite art work rendering which challenges the observer into visually equating the enlarged second member as a puzzle piece associated with the shaped space or void in the first member.

Therefore, it is among the primary objects of the present invention to provide a novel art work which stimulates the observer into associating an irregularly shaped member with a space in a second member that is intended to complete a total pictorial rendering or graphic representation.

Another object of the present invention is to provide a novel wall hanging or art work having a first member with a shaped space or void and a second member having a conformal shape to the shape of the space or void, but which is substantially larger in size wherein the visual co-relation between the first and second members by an observer adds to the total visual effect of the decorative value.

Another object of the present invention is to provide a novel wall hanging wherein a first member is composed of a plurality of puzzle pieces arranged in a given graphic matrix having a selected piece of the puzzle greatly enlarged into a second member arranged in close proximity to the first member so that the combination presents a novel graphic and attractive, as well as decorative, arrangement.

Another object of the present invention is to provide a novel decorative arrangement that greatly impacts the vision of an observer in that first and second members are associated with each other in conformal shape that is tied into the overall pictorial matrix of a decorative rendering.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
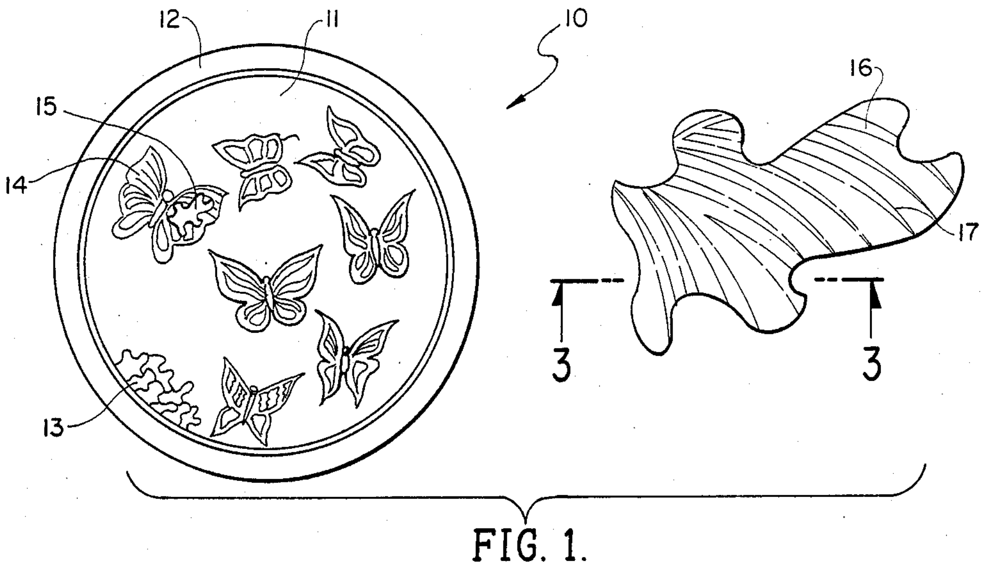
FIG. 1 is a front elevational view of the decorative wall hanging incorporating the inventive concept.

Referring to FIG. 1, the novel art work of the present invention is illustrated in the general direction of arrow 10 which includes a first member 11 having a peripheral frame 12 surrounding a graphic matrix or rendering which is composed of a plurality of puzzle pieces such as puzzle piece 13. Although only a few puzzle pieces are illustrated in FIG. 1, it is to be understood that the entire graphic rendering or art work is composed of the plurality of irregularly shaped individual puzzle pieces which have been fitted or interlocked together to form the first member 11. It is also to be noted that after the plurality of irregular puzzle pieces have been put together into the mosaic or matrix, a composite graphic rendering is displayed on the surface of the first member 11 which, in the present illustration, takes the form of a plurality of butterflies such as the graphic representation of butterfly 14. In this display, it is to be particularly noted that a space or void is provided, as identified by numeral 15, which is of irregular shape and is defined by adjacent puzzle pieces forming the first member 11. The space or void is not disguised or covered since its observance by a viewer is needed to produce the decorative value of the present invention. The pictorial rendering or representation may be painted on the surface of the plurality of puzzle pieces or it may be printed or carried on the surface in any desired manner.

Continuing with reference to FIG. 1, it is noted that a second member, identified by numeral 16, is provided that is of irregular peripheral configuration. The shape or configuration of the second member is conformal and identical to the shape of the defined space or void 15 in the first member 11. However, a feature of the invention resides in the fact that the second member 16 is substantially and notably larger in size than the space or void 15. The second member 16 includes a surface rendering, identified by numeral 17, which coordinates or co-relates with the overall pictorial representation carried on the first member 11. Furthermore, it is to be noted that the first member 11 and the second member 16 are located in fixed spaced-apart relationship in a side-by-side arrangement so that both members are observed by the viewer when the art work is being evaluated. It is apparent to the observer or viewer that the second member 16 is a puzzle piece which, by virtue of its shape or configuration, would normally cover the space or void 15 except for the extreme difference in size. Therefore, it can be seen that there is visual coaction between the first and second members and that the two members are co-related with respect to one another in providing a unitary decorative art work. The first and second members may be suitably mounted on the surface of a wall by hangers, pegs, adhesive hooks, bonding materials or the like.

Figure 2:
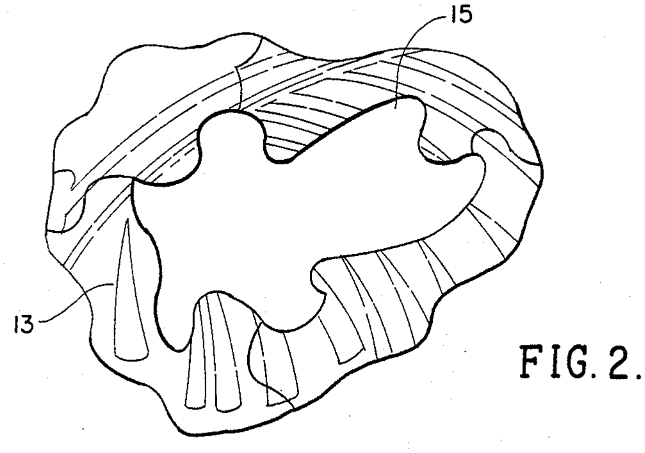
FIG. 2 is an enlarged fragmentary view of a portion of the first member shown in FIG. 1 defining a void or space.

Referring now in detail to FIG. 2, an enlarged view of the space or aperture 15 is illustrated wherein the irregular peripheral edges of surrounding playing pieces, such as puzzle piece 13, defines the opening. The overall configuration of the opening is conformal to the configuration or peripheral configuration of the second member 16.

Figure 3:
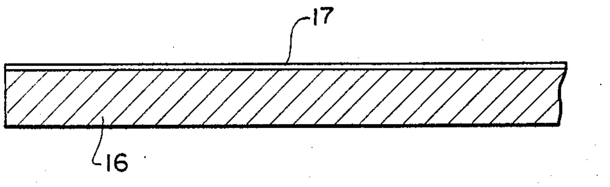
FIG. 3 is an enlarged transverse crosssectional view of the second member used in the combined rendering of FIG. 1 as taken in the direction of arrows 3—3 thereof.

Referring now in detail to FIG. 3, an enlarged view of the second member 16 is illustrated, showing that the member 16 is provided with a thickness and that the exposed surface of the member includes a decorative rendering portion 17. Such may be a printing, painting or other means of pictorial display.

Therefore, it can be seen that a decorative wall hanging or art work is provided constituting a pair of members in which the first member is composed of a plurality of puzzle pieces that are interlocked to provide a composite decorative or pictorial rendering. However, a single puzzle piece from the plurality is intentionally left out so as to create an irregularly shaped space or void and that the shape of the space or void is carried over onto a second member 16 which, except for its extremely enlarged size, would fit into the space or void. The first and second members are arranged in juxtaposition with each other so that an observer or onlooker will view both members together as a single piece of decorative art work.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A decorative art work comprising:

a first member consisting of a plurality of irregularly shaped puzzle pieces interlocked to provide a unity and coextensive display surface;

pictorial subject matter carried on said display surface;

a selected number of said puzzle pieces arranged next to each other so as to define an irregularly shaped space or void between their opposing wall surfaces wherein said space or void provides a discontinuity and interruption of said pictorial subject matter;

a second member having a peripheral edge shape conformal to the shape of said first member space or void and being of substantially and notably larger size than the size of said first member space or void;

said first and second members arranged in fixed spaced-apart relationship whereby said first member space or void appears to visually relate to acceptance of said second member into interlocked relationship with said selected number of said puzzle pieces;

said second member includes pictorial subject matter contributing to said first-mentioned pictorial subject matter to complete said pictorial subject matter; and the magnitude in size of said second member with respect to the size of said first member space or void is approximately within the range of one hundred to one.

* * * * *